United States Patent
Gordon et al.

(10) Patent No.: US 9,081,633 B2
(45) Date of Patent: Jul. 14, 2015

(54) REMOTE APPLICATION CONNECTION SHARING

(75) Inventors: Stephen R. Gordon, Bellevue, WA (US); Christopher G. Parker, Seattle, WA (US); Terry Malcolm Lentz, Jr., Redmond, WA (US); John M. VanderKolk, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1011 days.

(21) Appl. No.: 12/785,613

(22) Filed: May 24, 2010

(65) Prior Publication Data

US 2011/0289191 A1 Nov. 24, 2011

(51) Int. Cl.
G06F 15/16 (2006.01)
G06F 9/54 (2006.01)
G06F 17/30 (2006.01)

(52) U.S. Cl.
CPC .......... *G06F 9/544* (2013.01); *G06F 17/30873* (2013.01)

(58) Field of Classification Search
None
See application file for complete search history.

(56) References Cited

U.S. PATENT DOCUMENTS

| | | | |
|---|---|---|---|
| 5,537,548 A | 7/1996 | Fin et al. | |
| 6,240,444 B1 | 5/2001 | Fin et al. | |
| 6,546,492 B1 * | 4/2003 | Walker et al. | 726/3 |
| 7,379,977 B2 | 5/2008 | Walrath | |
| 7,596,760 B2 | 9/2009 | Sauve et al. | |
| 8,185,566 B2 * | 5/2012 | George et al. | 707/821 |
| 2006/0015763 A1 | 1/2006 | Nakajima | |
| 2007/0156813 A1 | 7/2007 | Galvez et al. | |
| 2010/0031153 A1 | 2/2010 | Ortwein et al. | |
| 2012/0023236 A1 * | 1/2012 | Backholm et al. | 709/226 |

FOREIGN PATENT DOCUMENTS

CN 101454774 A 6/2009
JP 2001/243154 A 9/2001

(Continued)

OTHER PUBLICATIONS

Maryka, Stephen., "Can Java EE Deliver the Asynchronous Web?", Retrieved at << http://www.theserverside.com/news/1363566/Can-Java-EE-Deliver-The-Asynchronous-Web >>, Jul. 1, 2009, pp. 10.

(Continued)

*Primary Examiner* — Mohamed Ibrahim
(74) *Attorney, Agent, or Firm* — Brian Haslam; Mike Allen; Micky Minhas

(57) ABSTRACT

One or more techniques and/or systems are disclosed for sharing a connection to a remote-based application running on a server. A plurality of client-side browser instantiations can be associated with the remote-based application, such as by running instantiations of the remote application locally on respective client machines. The client-side browser instantiations are able to write to and read from a local global storage regarding the remote-based application, and are notified of a state change to the local global storage, without polling. A first browser instantiation registers as a primary instantiation with the local global storage, and connects to the server for the remote-based application. One or more second browser instantiations registered with the local global storage, along with the primary browser instantiation, can send and receive updates for the remote-based application through the primary browser instantiation, utilizing state change notifications.

20 Claims, 7 Drawing Sheets

(56) References Cited

FOREIGN PATENT DOCUMENTS

JP          2001243154 A    9/2001
WO          98/22881 A1     5/1998

OTHER PUBLICATIONS

"Connecting to the database", Retrieved at << http://www.sql-workbench.net/manual/profiles.html >>, Retrieved Date: Mar. 22, 2010, pp. 7.
"@Media Ajax", Retrieved at << http://www.isolani.co.uk/blog/javascript/AtMediaAjaxDayTwo >>, Sep. 16, 2008, pp. 7.
Goddard, Ted., "Rogers iPhone 3G S Activation Nightmare", Retrieved at << http://blog.icefaces.org/blojsom/blog/default/2009/07/01/ >>, Jul. 1, 2009, pp. 13.
"International search report", Mailed Date: Dec. 23, 2011, Application No. PCT/US2011/036870, Filed Date: May 17, 2011, pp. 8.
Int. Preliminary Report cited in PCT Application No. PCT/US2011/036870 dated Nov. 27, 2013, 4 pgs.
First Chinese Office Action cited in Chinese Application No. 201180025641.7 dated Oct. 10, 2013, 2 pgs.
Reply first Chinese Office Action cited in Chinese Application No. 201180025641.7 dated Jan. 10, 2014, 4 pgs.
Second Chinese Office Action cited in Chinese Application No. 201180025641.7 dated 13/31/2014, 3 pgs.
Reply second Chinese Office Action cited in Chinese Application No. 201180025641.7 dated Jul. 28, 2014, 2 pgs.
EP Search Report cited in EP Application No. 11787134.3 dated Sep. 8, 2014, 7 pgs.
Third Chinese Office Action cited in Chinese Application No. 201180025641.7 dated Oct. 8, 2014, 3 pgs.
Reply Third Chinese Office Action cited in Chinese Application No. 201180025641.7 dated Feb. 15, 2015, 2 pgs.
EP Communication cited in EP Application No. 11787134.3 dated Sep. 25, 2014, 1 pg.
Reply EP Communication cited in EP Application No. 11787134.3 dated Mar. 12, 2015, 4 pgs.

* cited by examiner

REMOTE APPLICATION CONNECTION SHARING

BACKGROUND

Web browsers provide a way for users of client computers to navigate to web-sites using the Internet. For example, a client computer can provide a connection to the Internet, and using a web browser, the user can navigate to a particular remote server that is also connected to the Internet in order to connect to the web-site served by the remote server. Further, remote-based applications, such as web applications (web-apps), can be provided by a remote server connected to the Internet, and a client computer may run the web-app locally by connecting to the remote server providing the web-app. Additionally, a client computer may open a plurality of browser windows, and/or browser tabs, that respectively connect to different or a same remote server to run web-apps, and/or connect to web-sites

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In certain circumstances, when accessing remote servers over the Internet, it is costly and undesirable for more than one browser window or tab to maintain a separate connection to the server, where respective instances are getting the same data from the remote server. These types of multiple connections can become duplicative and can slow connection speed for a client machine by maintaining the multiple connections.

As an example, for an instant messenger chat application that is provided by a remote server, in a browser, when using multiple tabs, each tab is connected to the app server and gets the same data from server. However, from the user's point of view, it is just a seamless single experience. Currently, for example, a website may have to repeatedly query the application server to see if there are updates on a page (e.g., web-app). In this example, respective tabs or windows will need a separate connection to check for updates on the server. This constant querying may be computationally expensive both locally (e.g., client-side) and remotely (e.g., server-side).

Accordingly, one or more techniques and/or systems are provided herein that provide a same experience to a user, while having multiple tasks (e.g., remote-based applications running in a browser) having a single connection to the remote server while sharing the connection to the server. For example, merely one browser window and/or tab maintains a connection to the server for remote-based applications, and allows updates for a plurality of other instantiations of the same web-application running on the client.

In one embodiment for sharing a connection to a remote-based application with a plurality of client-side browser instantiations, a plurality of client-side browser instantiations that are associated with a remote-based application are notified of a change to a state of a local global storage, without polling, where the client-side browser instantiations are able to write to and read from the local global storage. Further, a first browser instantiation can register as a primary instantiation with the local global storage, and provide a connection to a server for the remote-based application. Additionally, the primary instantiation uses the connection with the server to write updates to the local global storage for one or more second browser instantiations, and communicates updates from the one or more second browser instantiations to the server for the remote-based application.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
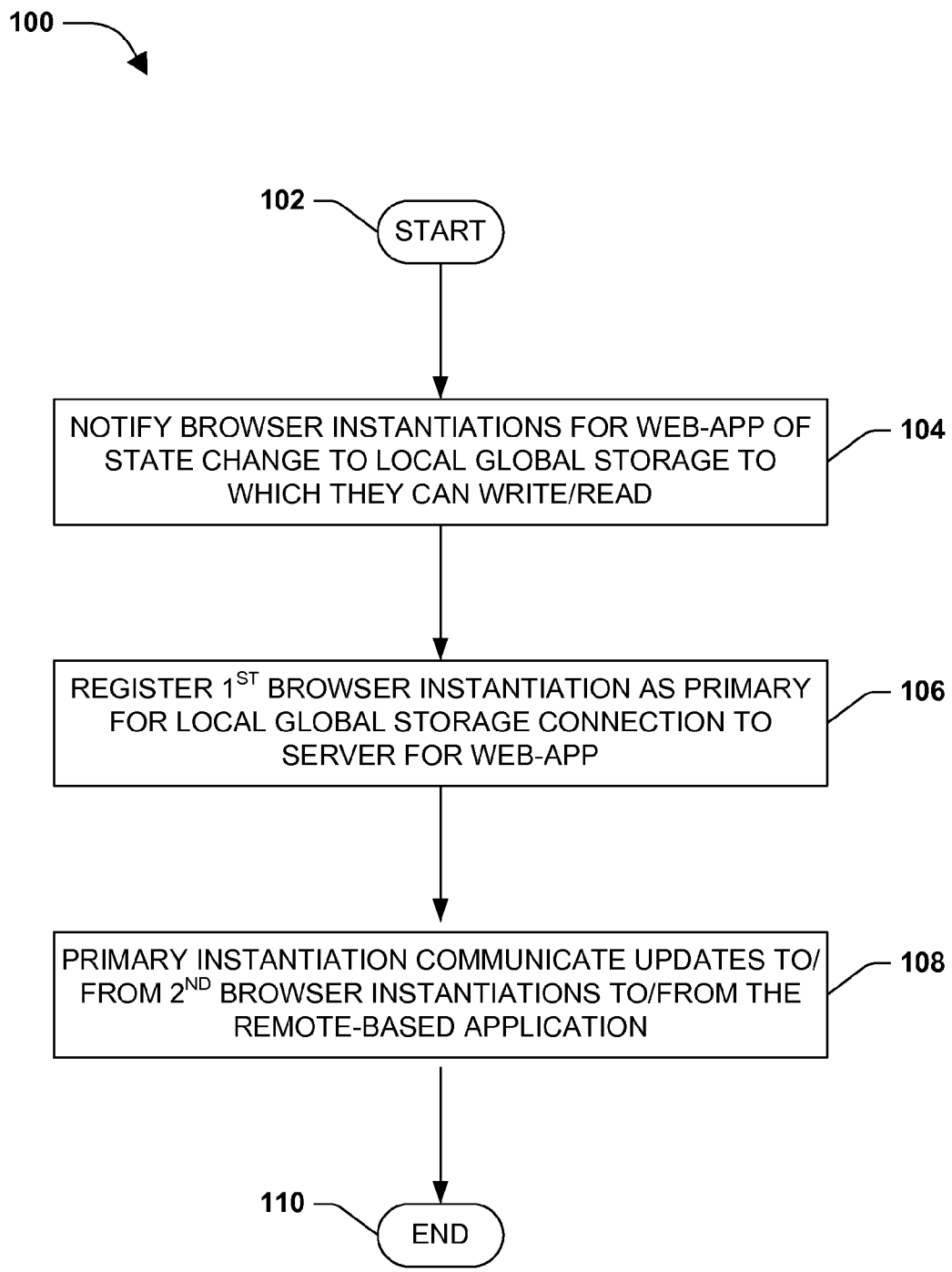
FIG. 1 is a flow diagram of an exemplary method for sharing a connection to a remote-based application with a plurality of client-side browser instantiations.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 is a flow diagram of an exemplary method 100 for sharing a connection to a remote-based application with a plurality of client-side browser instantiations. The exemplary method 100 begins at 102 and involves notifying a plurality of client-side browser instantiations of a change to a state of the local global storage, without polling, at 104. In this embodiment, the browser instantiations are associated with a remote-based application, and are able to write to and read from a local global storage.

In one embodiment, local global storage comprises "web storage" that allows for data to be stored locally (e.g., on a client machine) for a web browser. As an example, HTML5 (hypertext markup language protocol 5) provides for local storage for web browsers, where respective web browser instantiations (e.g., browser windows, browser tabs) that are from a same domain can access the data stored locally, thereby providing for local global storage (e.g., global to the respective scripts that are from the same domain). That is, in this example, separate instances of a same web application (web-app) can run in different windows (or tabs) without interfering with one another, and are able to communicate locally with each other through the local global storage, such as by providing updates to the local global storage.

In one embodiment, the local global storage can comprise an associative array data storage model, where a collection of keys (e.g., unique keys) are associated with one or more value (e.g., or a set of values), for example. In this embodiment, a value is mapped to a key using an array (e.g., the array maps the key to the value), which creates a relationship between the key-value pair. Further, in this embodiment, when a change in a state of the local global storage occurs, such as a change to a key-value pair, a notification can be sent (e.g., automatically) to browser instantiations using the local global storage (e.g., those running web-apps from a same domain).

In one embodiment, the change in state of the local global storage can occur when one or more operations are performed. For example, an "add" operation can comprise mapping a new key is to a new value (e.g., entering a new key-value pair). Further, a "reassign" operation can comprise aping an old key to a new value (e.g., changing the value for a key-value pair). Additionally, a "remove" operation may unbind a key from a value and remove the key from a key set for the storage (e.g., deleting a key-value pair). In this embodiment, for example, when any one of these operations occur, for example, a notification can automatically be sent for the state change. Therefore, polling the local global storage (e.g., periodically requesting a state status) for state changes is not needed.

Returning to FIG. 1, at 106, a first browser instantiation registers as a primary instantiation with the local global storage. Here, the primary instantiation connects to a server for the remote-based application, such as to interact with a web-app. In one embodiment, a new browser instantiation may be initiated by a user on their client machine, for example. The new browser instantiation can register with the local global storage when it initiates the instantiation of the web-app (e.g., a web-app from a particular domain, such as an instant messenger service).

Further, a browser instantiation can register as the primary, where it connects with the remote server that provides for the application to run in the browser, for example. That is, as an example, the primary instantiation running the remote application can have a direct connection to the remote server over a local port, thereby being in communication with the remote server to send and retrieve updates for the application. In one embodiment, the remote server may provide for an instant messaging application that allows users to send messages back and forth, and the primary instantiation can retrieve updates, such as messages, and send updates to the server.

At 108 in the exemplary method 100, the primary instantiation uses the connection with the server to write updates to the local global storage for one or more second browser instantiations from the remote-based application. Further, the primary instantiation uses the connection with the server to communicate updates from the one or more second browser instantiations to the remote-based application. In this way, for example, primary browser instantiation can act as a conduit for a plurality of browser instantiations of a web-app, allowing merely one connection to provide remote server communication for the plurality of instantiations.

In one embodiment, one or more second browser instantiations may initiate the same remote-based application, and register with the local global storage upon instantiation, for example. In this example, instead of connecting with the server that is providing the remote application in the one or more browser windows (or tabs), the second instantiations can merely receive and distribute updates through the local global storage using the primary instantiation connection to the server.

That is, for example, the second instantiations can update their remote-based application instantiations by updating the local global storage, which will cause the primary instantiation to be notified of the change in state. In this example, the primary instantiation can then provide the update from the second instantiation to the server by reading from the local global storage. Further, the primary instantiation can retrieve updates from the server for the plurality of second instantiations, for example, and write them to the local global storage. In this example, the second instantiations will be notified of a change, and can update their instantiations by reading from the local global storage. In this way, in this example, merely the primary browser instantiation of the remote-based application needs to be connected to the server to provide for communication with a plurality of instantiations of the remote-based application on a client machine.

The secondary browser instantiations having used the primary instantiation connection to communicate with the server for the remote-based application, the exemplary method 100 ends at 110.

Figure 2:
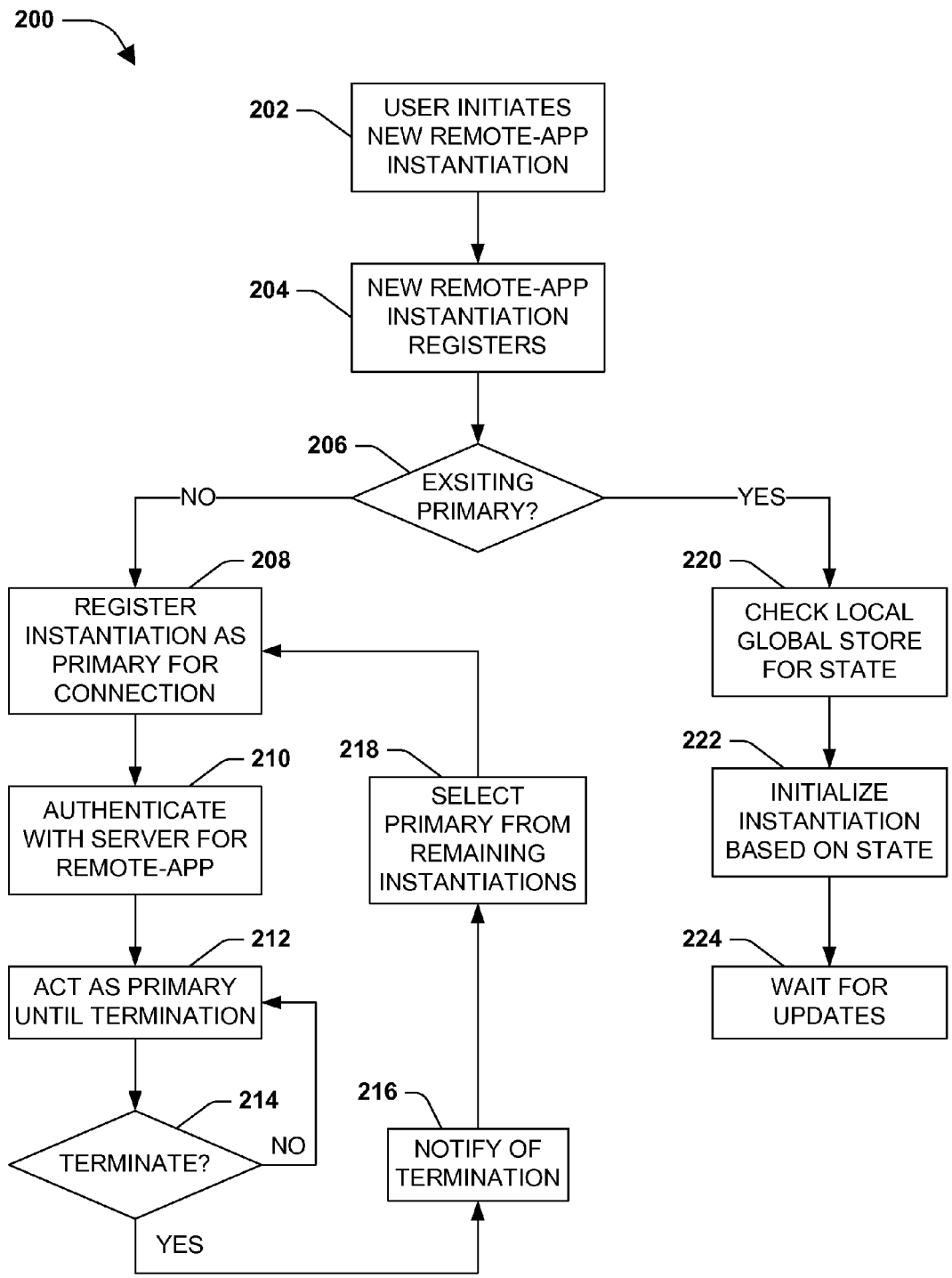
FIG. 2 is a flow diagram illustrating an exemplary embodiment of a method where primary and secondary browser instantiations register with a local global storage.

FIG. 2 is a flow diagram illustrating an exemplary embodiment 200 of at least some of a method where primary and secondary browser instantiations register with a local global storage. At 202, a user initiates a new remote-based application instantiation, such as by opening a browser window and selecting to run web-app (e.g., instant messenger). At 204, the new remote-based application instantiation is registered with the local global storage, such as using the domain for the server providing service for the application.

In one embodiment, for example, when a new instantiation is created for a web-app, a portion of local client-based memory can be apportioned for the browser to store information locally for the application. As an example, currently, browsers may be allowed to store "cookies" locally, which provide information for a web-site to use when the user navigates back to the site, such as client/user information that helps make the site work faster/better. However, browser cookies are typically limited to merely storing text strings of limited size, and can be accessed (e.g., read/write) by both a server and a client side.

In this embodiment, the allocated memory for the application can be limited to merely the domain from which the application is served, and can comprise the local global storage. Here, the local global storage can provide for client-side read/write, but mitigate or inhibit the server-side from writing to this type of web-storage, for example. In this way, in this example, the new instantiation registers with the local global storage for the particular domain, and may now write updates to and read from the storage, along with any other instantiations that are registered with this local global storage.

At 206, if a primary instantiation is not present for the remote-based application (NO at 206), the new instantiation can register itself as the primary instantiation for the remote-based application, at 208. At 210, the primary instantiation can connect to the server for the remote-based application, such as by contacting the IP address for the server, and authenticate with the server. As an example, the primary instantiation is connected to the server for communicating updates for the remote-based application. In this example, the user may send messages to contacts and receive messages from contacts over the connection to the primary instantiation.

At the primary instantiation can act as the primary, thereby maintaining a connection with the server, until the primary instantiation is terminated. If the primary has not been terminated (NO at 214), there is an existing primary instantiation at 206. Therefore, a new instantiation can check the local global storage for its current state, at 220. As an example, the current state of the local global storage can comprise a state of existing key-value pairs.

At 222, the non-primary instantiation can initialize itself based on the current state of the local global storage, for example, according to the key-value pairs, and wait for state changes that comprise updates from the primary instantiation, at 224. In this way, if notified of a change in state, the newly registered instantiation can identify the updates that caused the change, based on its initial state, for example, and read the updates if needed.

At 214, if the primary browser instantiation is terminated (YES at 214), such as by closing a window or tab, or logging out, a notification of termination of the primary instantiation can be sent out to other instantiations registered with the local global storage, at 216. In one embodiment, the primary instantiation can register with the local global storage that it is terminating, for example, providing for advance notification to select a new primary at or before termination.

At 218, a new primary instantiation can be selected from remaining browser instantiations registered with the local global storage (e.g., and still operating) for the remote-based application. In one embodiment, selecting a new primary instantiation can comprise applying a selection function to respective identifications of the one or more remaining browser instantiations to select the new primary instantiation. For example, respective instantiations of the web-app may comprise identifiers e.g., (Universally Unique Identifiers—UUIDs), and a selection function can be applied to the identifier, such as selecting a lowest number, applying a random generator, or some other function.

After a new primary browser instantiation is selected, at 218, the selected instantiation can register as the primary, at 208, connect and authenticate with the server, at 210, and act as the primary until termination, at 212. As an example, if no other instantiations are registered with the local global storage for the remote-based application when the primary terminates at 214, the local global storage can be removed from use for the remote-based application, such as session storage, or may be persistent for the remote-based application until removed by the user.

Figure 3:
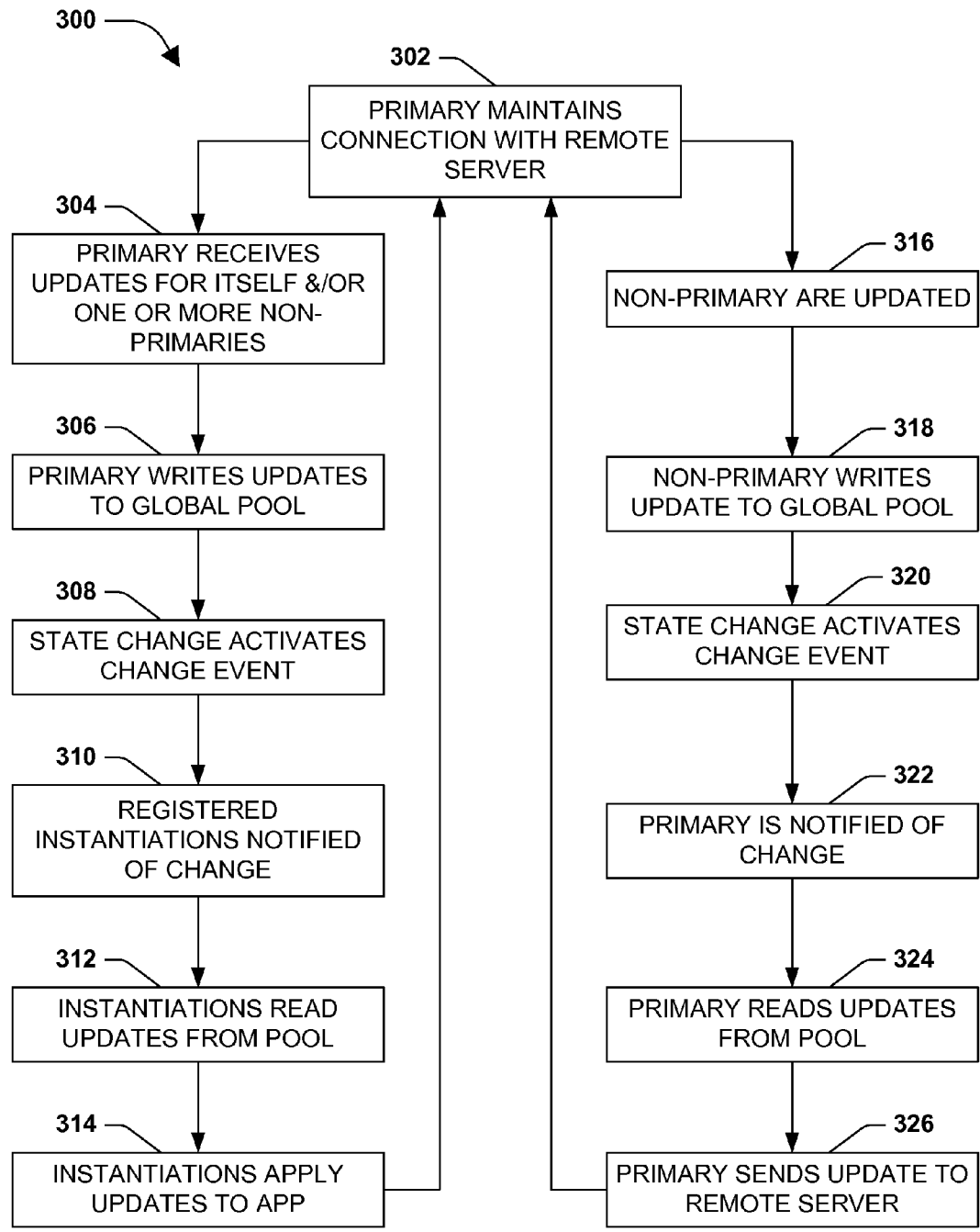
FIG. 3 is a flow diagram illustrating an exemplary embodiment of a method where a plurality of browser instantiations may be updated for a remote-based application using a connection to a primary instantiation.

FIG. 3 is a flow diagram illustrating an exemplary embodiment 300 of at least some of a method where a plurality of browser instantiations may be updated for a remote-based application using a connection to a primary instantiation. At 302, the primary instantiation maintains a connection with the remote server that provides the remote-based application. In one embodiment, the primary instantiation can monitor the local global storage for non-primary browser instantiations updates for the remote-based application to send to the server.

For example, a user may be using a service that allows them to chat online with a plurality of connections at a same time. In this example, the user may wish to have respective conversations in separate windows or window tabs to help organize different conversations, or mitigate interference with each other. The primary instantiation can maintain the connection to the server that is providing the chats, and update incoming and outgoing chats using the local global storage for all of the instantiations.

At 304, the primary instantiation receives updates for the remote-based application from the server. Here the updates may be for the primary instantiation, and/or one or more of the plurality of non-primary instantiations. As an example, if the user is conversing with several contacts using several different browser instantiations of the instant messaging application, and some of the contacts send replies, the primary can retrieve the replies from the server. The replies may be for the primary, and/or one or more of the non-primary instantiations.

At 306, the primary instantiation writes the updates to the local global storage (global pool). At 308, a state change to the global pool is detected, such as by a change to one or more key-value pairs. Here, the state change activates a change event, which can be configured to cause notifications to be sent to the respective browser instantiations registered with the global pool. At 310, the registered browser instantiations are notified of the state change to the global pool.

At 312, the registered browser instantiations read the updates from the global pool. For example, changes to a key-value pair (e.g., new key, new value, removed key) can be detected and the update read from the global pool. In this embodiment, the respective instantiations read from the global pool; however, merely those to which the updates apply will apply the updates. At 314, the browser instantiations to which the updates apply can apply the updates. For example, the updated instantiation can display the message received from a contact in the instant messaging application.

At 316, a non-primary instantiation is updated. For example, a user that has a plurality of remote-based applications open, such as in several browser windows or tabs, can update one or more of the instantiations on the client-side. In this example, the user may write a message in reply to one of their contacts they are conversing with in the instant messaging application, thereby updating the client-side instantiation. It will be appreciated that the arrow from 302 to 316 indicates a timeline as opposed to direction of a process flow. For example, in this embodiment, the primary will maintain a connection to the server while non-primaries are updated by users, for example.

At 318, the non-primary instantiation that has been update, such as by the user, writes the update to the local global storage (global pool). At 320, the state change to the global pool is detected, and the state change activates a change event. At 322, the change event can cause the primary instantiation (e.g., and the other non-primary instantiations) to be notified of the change in state. The primary can read from the global pool, at 324, to get the update from the non-primary instantiation. At 326, the primary instantiation uses its connection with the server to send the update from the non-primary to the server. In this way, for example, the update can be propagated for the non-primary with it having a direct connection to the server.

Figure 4:
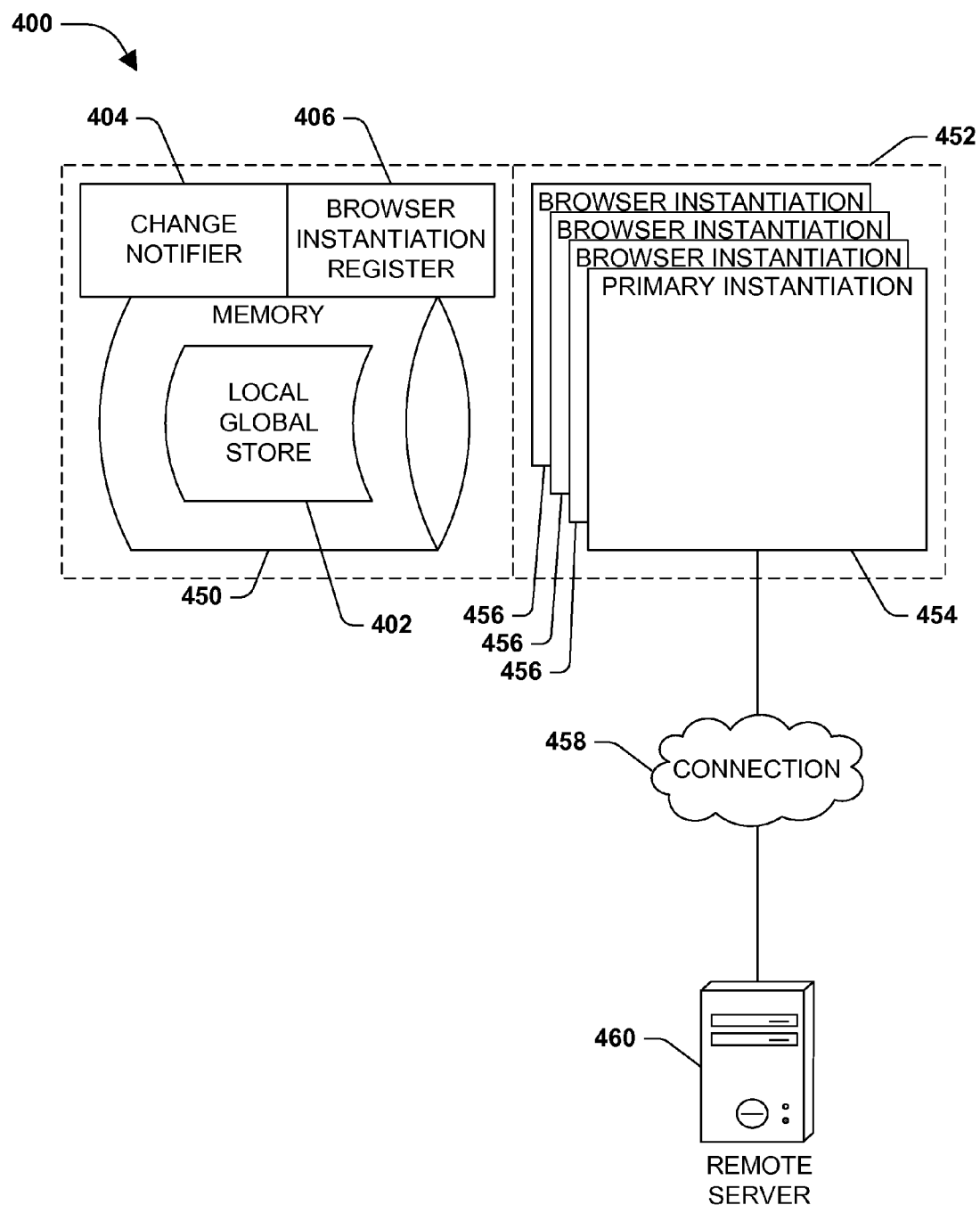
FIG. 4 is a component diagram of an exemplary system for sharing a connection to a remote-based application with a plurality of client-side browser instantiations.

A system may be devised that allows a plurality of remote-based applications (e.g., web-apps) to run on a client machine, for example, while merely one of the instantiations maintains a connection to a remote server for the application, and the respective instantiations can be updated using this connection. FIG. 4 is a component diagram of an exemplary system 400 for sharing a connection to a remote-based application with a plurality of client-side browser instantiations.

A local global storage component 402 comprised in a memory component 450 provides for writing and reading access to a plurality of client-side browser instantiations 452 associated with a remote-based application, served by a remote server 460. Further, the local global storage component 402 provides for a primary browser instantiation 454 to be able to write updates to the local global storage component 402 for one or more second browser instantiations 456 for the remote-based application, and communicate updates from the one or more second browser instantiations 456 to the remote-based application.

That is, for example, the remote application can provide updates using the server 460, and the primary instantiation can write the updates to the local global storage 402. In this example, the second browser instantiations 456 can read the updates from the local global storage 402. Further, the second browser instantiations 456 can write to the local global storage component 402, and the primary instantiation 454 can read the updates and communicate them to the remote application on the remote server 460.

A change notification component 404 is operably coupled with the local global storage component 402 to provide notification of a state change of the local global storage 402 to one or more browser instantiations 452 registered with the local global storage component 402, without polling by the one or more browser instantiations 452. For example, instead of the browser instantiations 452 periodically sending a request to the local global storage component 402 for any changes that may have occurred, the change notification component 404 is configured to cause notifications of a state change to be sent to the browser instantiations 452.

A browser instantiation registration component 406 is operably coupled with the local global storage component 402 and provides for a first browser instantiation to register as a primary browser instantiation 454 for the remote-based application. Here, the primary browser instantiation 454 connects 458 to the remote server 460 to communicate the updates. Further, the browser instantiation registration component 406 provides for the one or more second browser instantiations 456 to register with the local global storage component 402 in order to send and retrieve updates for the remote-based application through the primary browser instantiation 454.

Figure 5:
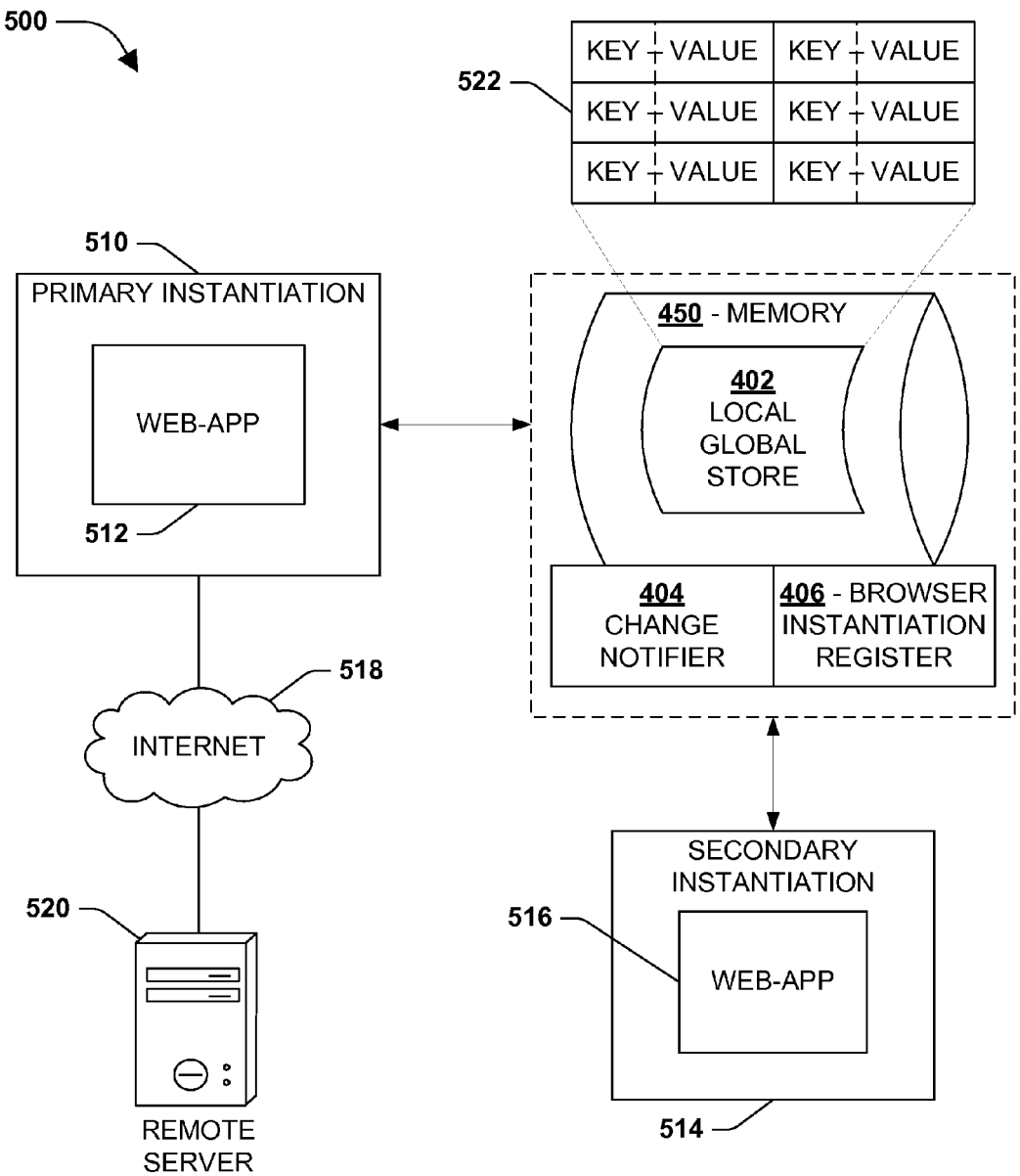
FIG. 5 is a component diagram illustrating one embodiment where one or more systems and/or techniques described herein may be implemented.

FIG. 5 is a component diagram illustrating one embodiment 500 where one or more systems and/or techniques described herein may be implemented. In one embodiment, the browser instantiations 510, 514 may comprise separate browser windows, respectively comprising an instantiation of the remote-based application 512, 516 (e.g., a web-app). Further, the browser instantiations 510, 514 may comprise separate tabs in a browser, respectively comprising the remote-based application. Additionally, the browser instantiations 510, 514 may comprise widgets that are running the remote-based application, such as on a client desktop.

In one embodiment, the local global storage component 402 can allow client-side writing of data to the local global storage 402, and/or reading of data from the local global storage 402, such as from the web-apps 512, 516 running in the primary and secondary instantiations 510, 514. Further, the local global storage component 402 can provide notification to registered client-side browser instances, such as the primary and secondary instantiations 510, 514, when a change in state occurs to the local global storage component 402.

In one embodiment, the change in state can cause the change notification component 404 to activate a change event, which causes the notification to be sent to the instantiations 510, 514. In one embodiment, the local global storage component 402 can comprise key-value pairs 522 that can trigger the change notification component 404 to activate the state change event. The state change event may be activated when a key is added, when a key is removed, and/or when a key value is changed.

In one embodiment, the notification of change in state to the local global storage component 402 can cause the one or more browser instantiations 510, 514 registered with the local global storage component 402 to read from the local global storage component 404 to identify updates from the remote-based application on the remote server written by the primary browser instantiation 510. That is, when the primary instantiation 510 receives an update from the server, such as over an Internet connection 518, the primary instantiation 510 can write the update to the local global storage 402. The notification of a change in state can then cause the one or more secondary instantiations 514 to read the updates from the local global storage 402, for example.

Figure 6:
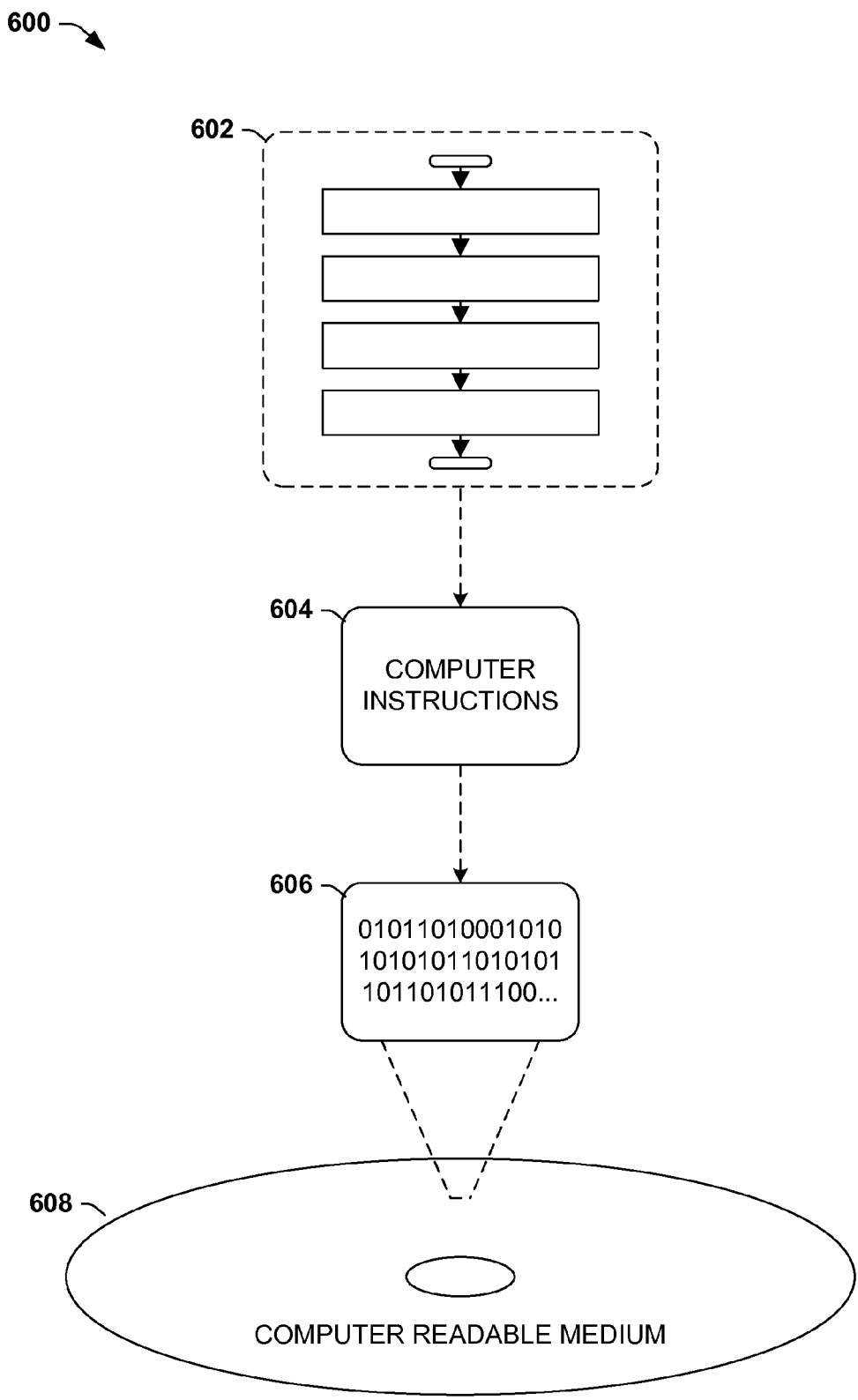
FIG. 6 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 6, wherein the implementation 600 comprises a computer-readable medium 608 (e.g., a CD-R, DVD-R, or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as the exemplary method 100 of FIG. 1, for example. In another such embodiment, the processor-executable instructions 604 may be configured to implement a system, such as the exemplary system 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
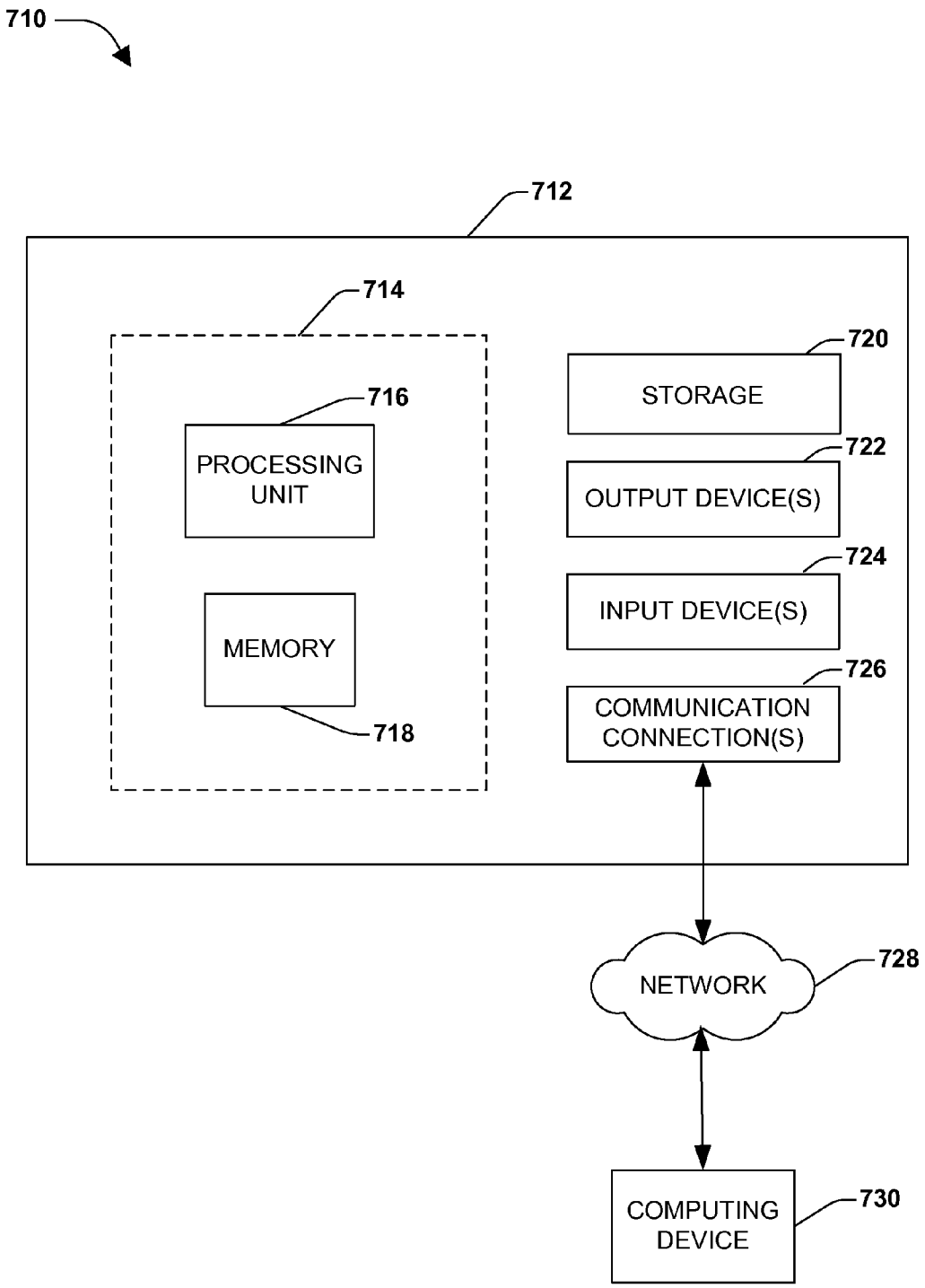
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 710 comprising a computing device 712 configured to implement one or more embodiments provided herein. In one configuration, computing device 712 includes at least one processing unit 716 and memory 718. Depending on the exact configuration and type of computing device, memory 718 may be volatile (such as RAM, for example), non-volatile (such as ROM, flash memory, etc., for example) or some combination of the two. This configuration is illustrated in FIG. 7 by dashed line 714.

In other embodiments, device 712 may include additional features and/or functionality. For example, device 712 may also include additional storage (e.g., removable and/or non-removable) including, but not limited to, magnetic storage, optical storage, and the like. Such additional storage is illustrated in FIG. 7 by storage 720. In one embodiment, computer readable instructions to implement one or more embodiments provided herein may be in storage 720. Storage 720 may also store other computer readable instructions to implement an operating system, an application program, and the like. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 712. Any such computer storage media may be part of device 712.

Device 712 may also include communication connection(s) 726 that allows device 712 to communicate with other devices. Communication connection(s) 726 may include, but is not limited to, a modem, a Network Interface Card (NIC), an integrated network interface, a radio frequency transmitter/receiver, an infrared port, a USB connection, or other interfaces for connecting computing device 712 to other computing devices. Communication connection(s) 726 may include a wired connection or a wireless connection. Communication connection(s) 726 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 712 may include input device(s) 724 such as keyboard, mouse, pen, voice input device, touch input device, infrared cameras, video input devices, and/or any other input device. Output device(s) 722 such as one or more displays, speakers, printers, and/or any other output device may also be included in device 712. Input device(s) 724 and output device(s) 722 may be connected to device 712 via a wired connection, wireless connection, or any combination thereof. In one embodiment, an input device or an output device from another computing device may be used as input device(s) 724 or output device(s) 722 for computing device 712.

Components of computing device 712 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 712 may be interconnected by a network. For example, memory 718 may be comprised of multiple physical memory units located in different physical locations interconnected by a network.

Those skilled in the art will realize that storage devices utilized to store computer readable instructions may be distributed across a network. For example, a computing device 730 accessible via network 728 may store computer readable instructions to implement one or more embodiments provided herein. Computing device 712 may access computing device 730 and download a part or all of the computer readable instructions for execution. Alternatively, computing device 712 may download pieces of the computer readable instructions, as needed, or some instructions may be executed at computing device 712 and some at computing device 730.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method, comprising:
   registering a first browser instantiation of a browser as a primary instantiation with a local global storage, where the primary instantiation connects to a server;
   writing an update to the local global storage, the update based upon data received from the server via the first browser instantiation and directed to a second browser instantiation of the browser, the second browser instantiation not directly connected to the server; and
   automatically notifying the second browser instantiation of a change to a state of the local global storage responsive to determining a change to a key-value pair comprised in a plurality of key-value pairs comprised in the local global storage, the change to the key-value pair based upon the update.

2. The method of claim 1, comprising providing an indication of a termination of the primary instantiation.

3. The method of claim 2, comprising selecting a new primary instantiation after the termination of the primary instantiation.

4. The method of claim 1, comprising registering a new browser instantiation with the local global storage upon instantiation of the new browser instantiation with a remote-based application.

5. The method of claim 1, the first browser instantiation and the second browser instantiation associated with a remote-based application.

6. The method of claim 1, comprising receiving remote-based application updates for the primary instantiation from the server.

7. The method of claim 1, the local global storage comprised in memory of a computing device upon which the browser is executing.

8. The method of claim 1, comprising monitoring the local global storage for updates for non-primary browser instantiations.

9. The method of claim 1, the primary instantiation connected to the server via a port.

10. The method of claim 1, comprising activating a change notification event in the local global storage upon one or more of:
    addition of a key;
    removal of a key; or
    changing of a key value.

11. The method of claim 1, the key-value pair comprising a key.

12. The method of claim 1, the key-value pair comprising a value.

13. A system, comprising:
    one or more processing units; and
    memory comprising instructions that when executed by at least one of the one or more processing units, perform a method comprising:
      registering a first browser instantiation of a browser as a primary instantiation with a local global storage, where the primary instantiation connects to a server;
      writing an update to the local global storage, the update based upon data received from the server via the first browser instantiation and directed to a second browser instantiation of the browser; and
      automatically notifying the second browser instantiation of a change to a state of the local global storage responsive to determining a change to a key-value pair comprised in a plurality of key-value pairs comprised in the local global storage, the change to the key-value pair based upon the update.

14. The system of claim 13, at least one of the first browser instantiation or the second browser instantiation comprising:
    a tab in a browser;
    a browser window; or
    a widget.

15. The system of claim 13, the method comprising at least one of:
    allowing client-side writing of data to the local global storage; or
    allowing client-side reading of data from the local global storage.

16. The system of claim 13, the first browser instantiation and the second browser instantiation associated with a remote-based application.

17. The system of claim 13, the local global storage comprised in memory of a computing device upon which the browser is executing.

18. The system of claim 13, the method comprising receiving remote-based application updates for the primary instantiation from the server.

19. The system of claim 13, the method comprising monitoring the local global storage for updates for non-primary browser instantiations.

20. A computer-readable storage device medium comprising instructions that when executed, perform a method, comprising:
    registering a first browser instantiation of a browser as a primary instantiation with a local global storage, where the primary instantiation connects to a server;
    writing an update to the local global storage, the update received via the connection to the server and directed to a second browser instantiation of the browser, the second browser instantiation not directly connected to the server; and
    automatically notifying the second browser instantiation of a change to a state of the local global storage responsive to determining a change to a key-value pair comprised in a plurality of key-value pairs comprised in the local global storage, the change to the key-value pair based upon the update.

\* \* \* \* \*